United States Patent
Kawahara et al.

(10) Patent No.: US 9,893,832 B2
(45) Date of Patent: Feb. 13, 2018

(54) TRANSFER APPARATUS AND TRANSFER METHOD

(71) Applicant: FUJITSU LIMITED, Kawasaki-shi, Kanagawa (JP)

(72) Inventors: Hidetaka Kawahara, Shimotsuga (JP); Hiromichi Makishima, Oyama (JP)

(73) Assignee: FUJITSU LIMITED, Kawasaki (JP)

( * ) Notice: Subject to any disclaimer, the term of this patent is extended or adjusted under 35 U.S.C. 154(b) by 335 days.

(21) Appl. No.: 14/572,092

(22) Filed: Dec. 16, 2014

(65) Prior Publication Data
US 2015/0207584 A1    Jul. 23, 2015

(30) Foreign Application Priority Data
Jan. 21, 2014   (JP) ................................. 2014-008714

(51) Int. Cl.
H04J 14/00 (2006.01)
H04J 14/02 (2006.01)
H04J 3/08 (2006.01)
H04J 3/16 (2006.01)

(52) U.S. Cl.
CPC ............ *H04J 14/0202* (2013.01); *H04J 3/08* (2013.01); *H04J 3/1652* (2013.01); *H04J 2203/0085* (2013.01)

(58) Field of Classification Search
None
See application file for complete search history.

(56) References Cited

U.S. PATENT DOCUMENTS

| | | | | |
|---|---|---|---|---|
| 7,133,404 B1* | 11/2006 | Alkhatib | ........... | H04L 29/12009 370/392 |
| 9,288,006 B1* | 3/2016 | Mok | .................... | H04J 14/0201 |
| 2005/0243834 A1* | 11/2005 | Fukuda | ................... | H04L 29/06 370/395.1 |
| 2009/0147718 A1* | 6/2009 | Liu | ..................... | H04L 12/1863 370/312 |
| 2010/0309930 A1* | 12/2010 | Harrison | ............. | H04L 12/4633 370/474 |
| 2011/0170864 A1 | 7/2011 | Tani et al. | | |
| 2013/0209087 A1* | 8/2013 | Yuan | .................... | H04J 3/1652 398/9 |

(Continued)

FOREIGN PATENT DOCUMENTS

| | | |
|---|---|---|
| JP | 2011-146917 | 7/2011 |
| JP | 2011-176750 | 9/2011 |
| WO | WO2012081083 | * 6/2012 |

*Primary Examiner* — Jeffrey M Rutkowski
*Assistant Examiner* — Andre Tacdiran
(74) *Attorney, Agent, or Firm* — Fujitsu Patent Center

(57) ABSTRACT

An Add Drop Multiplexer (ADM) includes a separating unit that extracts, from an ODU4 storing therein a plurality of HO-ODUs each of which stores therein at least one LO-ODU, first MSI values which correspond to the HO-ODUs and each of which identifies a different one of the LO-ODUs for each LO-ODU. The ADM includes a converting unit that converts the first MSI values which correspond to the HO-ODUs and each of which identifies a different one of the LO-ODUs, into second MSI values which correspond to the ODU4 and each of which identifies a different one of the LO-ODUs. The ADM includes an ODU processing unit that extracts the LO-ODUs from the ODU4, on the basis of the second MSI values resulting from the conversion by the converting unit.

7 Claims, 17 Drawing Sheets

(56) References Cited

U.S. PATENT DOCUMENTS

| | | | |
|---|---|---|---|
| 2013/0243428 A1* | 9/2013 | Mutoh | H04J 3/1652 398/45 |
| 2013/0322443 A1* | 12/2013 | Dunbar | H04L 12/185 370/390 |
| 2014/0193146 A1* | 7/2014 | Lanzone | H04J 3/14 398/2 |
| 2015/0256258 A1* | 9/2015 | Fu | H04B 10/27 398/58 |
| 2016/0087739 A1* | 3/2016 | Kametani | H04J 3/0691 398/56 |

* cited by examiner

FIG.3A

|    | 1st  | 2nd  |      |          |
|----|------|------|------|----------|
| 1  |      |      |      | LO-ODU2  |
| 2  |      |      | ODU3 | LO-ODU2  |
| 3  |      |      |      | LO-ODU2  |
| 4  |      |      |      | LO-ODU2  |
| 5  | OTU4 | ODU4 |      | LO-ODU2  |
| 6  |      |      | ODU3 | LO-ODU2  |
| 7  |      |      |      | LO-ODU2  |
| 8  |      |      |      | LO-ODU2  |
| 9  |      |      | ODU2 | LO-ODU0×8 |
| 10 |      |      | ODU2 | LO-ODU0×8 |

FIG.3B

|    | 1st  | 2nd  |      |           |
|----|------|------|------|-----------|
| 1  |      |      | ODU2 | LO-ODU0×8 |
| 2  |      |      | ODU2 | LO-ODU0×8 |
| 3  |      |      | ODU2 | LO-ODU0×8 |
| 4  |      |      | ODU2 | LO-ODU0×8 |
| 5  | OTU4 | ODU4 | ODU2 | LO-ODU0×8 |
| 6  |      |      | ODU2 | LO-ODU0×8 |
| 7  |      |      | ODU2 | LO-ODU0×8 |
| 8  |      |      | ODU2 | LO-ODU0×8 |
| 9  |      |      | ODU2 | LO-ODU0×8 |
| 10 |      |      | ODU2 | LO-ODU0×8 |

FIG.5A

| | | | |
|---|---|---|---|
| TS1 | 80hex | | |
| TS2 | 80hex | | |
| TS3 | 80hex | | |
| TS4 | 80hex | | |
| TS5 | 80hex | LO-ODU2#1 | → LO-ODUflex16#1 |
| TS6 | 80hex | | |
| TS7 | 80hex | | |
| TS8 | 80hex | | |
| TS9 | 81hex | | |
| TS10 | 81hex | | |
| TS11 | 81hex | | |
| TS12 | 81hex | | |
| TS13 | 81hex | LO-ODU2#2 | → LO-ODUflex16#2 |
| TS14 | 81hex | | |
| TS15 | 81hex | | |
| TS16 | 81hex | | |
| TS17 | 82hex | | |
| TS18 | 82hex | | |
| TS19 | 82hex | | |
| TS20 | 82hex | | |
| TS21 | 82hex | LO-ODU2#3 | → LO-ODUflex16#3 |
| TS22 | 82hex | | |
| TS23 | 82hex | | |
| TS24 | 82hex | | |
| TS25 | 83hex | | |
| TS26 | 83hex | | |
| TS27 | 83hex | | |
| TS28 | 83hex | | |
| TS29 | 83hex | LO-ODU2#4 | → LO-ODUflex16#4 |
| TS30 | 83hex | | |
| TS31 | 83hex | | |
| TS32 | 83hex | | |

Column headers: ORIGINAL ODU CONFIGURATION | ODU CONFIGURATION RESULTING FROM ERRONEOUS JUDGMENT

FIG.5B

| | | | |
|---|---|---|---|
| TS1 | 80hex | | |
| TS2 | 80hex | | |
| TS3 | 80hex | | |
| TS4 | 80hex | | |
| TS5 | 80hex | LO-ODU2#5 | → LO-ODUflex16#1 |
| TS6 | 80hex | | |
| TS7 | 80hex | | |
| TS8 | 80hex | | |
| TS9 | 81hex | | |
| TS10 | 81hex | | |
| TS11 | 81hex | | |
| TS12 | 81hex | | |
| TS13 | 81hex | LO-ODU2#6 | → LO-ODUflex16#2 |
| TS14 | 81hex | | |
| TS15 | 81hex | | |
| TS16 | 81hex | | |
| TS17 | 82hex | | |
| TS18 | 82hex | | |
| TS19 | 82hex | | |
| TS20 | 82hex | | |
| TS21 | 82hex | LO-ODU2#7 | → LO-ODUflex16#3 |
| TS22 | 82hex | | |
| TS23 | 82hex | | |
| TS24 | 82hex | | |
| TS25 | 83hex | | |
| TS26 | 83hex | | |
| TS27 | 83hex | | |
| TS28 | 83hex | | |
| TS29 | 83hex | LO-ODU2#8 | → LO-ODUflex16#4 |
| TS30 | 83hex | | |
| TS31 | 83hex | | |
| TS32 | 83hex | | |

FIG.10

| INDICATE | FUNCTION | BITS | DETAILS | |
|---|---|---|---|---|
| PT | PAYLOAD TYPE 0/1=1.25G TS/2.5G TS | 1 | PT | EXPLANATION |
| | | | 0 | HIGH-ORDER (AMP) (PT=20) |
| | | | 1 | HIGH-ORDER (GMP) (PT=21) |
| ODU STATE | ODU STATE INDEX DISPLAY TYPES OF HIGH-ORDER ODU'S INFORMATION IS GENERATED BY MAKING JUDGMENT FROM MSI VALUES OF HO-ODU'S | 4 | ODU STATE | EXPLANATION |
| | | | 0000 | - |
| | | | 0001 | ODU4 |
| | | | 0010 | ODU3 #1 |
| | | | 0011 | ODU3 #2 |
| | | | 0100 | ODU2 #1 |
| | | | 0101 | ODU2 #2 |
| | | | 0110 | ODU2 #3 |
| | | | 0111 | ODU2 #4 |
| | | | 1000 | ODU2 #5 |
| | | | 1001 | ODU2 #6 |
| | | | 1010 | ODU2 #7 |
| | | | 1011 | ODU2 #8 |
| | | | 1100 | ODU2 #9 |
| | | | 1101 | ODU2 #10 |
| | | | 1111 | UNUSED |

FIG.11

| ODU STATE | 1.25 G/2.5 G | CHANGED TO OPU MSI FORMAT |
|---|---|---|
| ODU STATE | PT | PT: i7 i6 i5 i4 i3 i2 i1 i0 ⇩ CHANGE MSI: o7 o6 o5 o4 o3 o2 o1 o0 |
| 0001 ODU4 | DON'T CARE | i[6:0] / i7 / o7 / o[6:0]<br>"0000000" TO "001111" : 0 / 0 / "0000000"<br> : 1 / 1 / i[6:0]<br>ELSE : - / 0 / "0000000"<br>*)-: DON'T CARE |
| 0010 / 0011 ODU3 | 0 PT=20 | i[5:0] / i7 / i6 / o7 / o6 / o5 / o[4:0]<br>"0000000" TO "001111": 0 0 1 0 0 i[4:0]<br> : 0 1 / 0 1<br> : 1 0 / 0 "0000000"<br> : 1 1<br>ELSE : - - 0 "0000000"<br>*)-: DON'T CARE<br>IDENTIFY ODTU TYPE FROM o[6:5] | 200A |
|  | 1 PT=21 | i[5:0] / i7 / i6 / o7 / o6 / o5 / o[4:0]<br>"0000000" TO "011111": 0 0 0 0<br> : 0 1 1 0 1 i[4:0]<br> : 1 0 / 1 0<br> : 1 1 0 "0000000"<br>ELSE : - - 0 "0000000"<br>*)-: DON'T CARE<br>IDENTIFY ODTU TYPE FROM o[6:5] | 200B |
| 0100 / 0101 / 0110 / 0111 / 1000 / 1001 / 1010 / 1011 / 1100 / 1101 ODU2 | 0 PT=20 | i[5:0] / i7 / i6 / o7 / o6 / o5 / o[4:0]<br>"0000000" TO "000011": 0 0 1 0 0 i[4:0]<br> : 0 1 0 "0000000"<br> : 1 0 0 "0000000"<br> : 1 1 0 "0000000"<br>ELSE : - - 0 "0000000"<br>*)-: DON'T CARE<br>IDENTIFY ODTU TYPE FROM o[6:5] | 200C |
|  | 1 PT=21 | i[5:0] / i7 / i6 / o7 / o6 / o5 / o[4:0]<br>"0000000" TO "000111": 0 0 1 0 0 i[4:0]<br> : 0 1 0 "0000000"<br> : 1 0 1 1 0 i[4:0]<br> : 1 1 0 "0000000"<br>ELSE : - - 0 "0000000"<br>*)-: DON'T CARE<br>IDENTIFY ODTU TYPE FROM o[6:5] | 200D |
| 0000 / 1111 / ELSE UNUSED | DON'T CARE | NO PROCESSING<br>o[7:0]<=all'0' |

FIG.17A

| TS1 | 80hex |
|---|---|
| TS2 | 80hex |
| TS3 | 80hex |
| TS4 | 80hex |
| TS5 | 80hex |
| TS6 | 80hex |
| TS7 | 80hex |
| TS8 | 80hex |
| TS9 | 81hex |
| TS10 | 81hex |
| TS11 | 81hex |
| TS12 | 81hex |
| TS13 | 81hex |
| TS14 | 81hex |
| TS15 | 81hex |
| TS16 | 81hex |
| TS17 | 82hex |
| TS18 | 82hex |
| TS19 | 82hex |
| TS20 | 82hex |
| TS21 | 82hex |
| TS22 | 82hex |
| TS23 | 82hex |
| TS24 | 82hex |
| TS25 | 83hex |
| TS26 | 83hex |
| TS27 | 83hex |
| TS28 | 83hex |
| TS29 | 83hex |
| TS30 | 83hex |
| TS31 | 83hex |
| TS32 | 83hex |

TS1–TS8: LO-ODU2#1
TS9–TS16: LO-ODU2#2
TS17–TS24: LO-ODU2#3
TS25–TS32: LO-ODU2#4

FIG.17B

| TS1 | 80hex |
|---|---|
| TS2 | 80hex |
| TS3 | 80hex |
| TS4 | 80hex |
| TS5 | 80hex |
| TS6 | 80hex |
| TS7 | 80hex |
| TS8 | 80hex |
| TS9 | 81hex |
| TS10 | 81hex |
| TS11 | 81hex |
| TS12 | 81hex |
| TS13 | 81hex |
| TS14 | 81hex |
| TS15 | 81hex |
| TS16 | 81hex |
| TS17 | 82hex |
| TS18 | 82hex |
| TS19 | 82hex |
| TS20 | 82hex |
| TS21 | 82hex |
| TS22 | 82hex |
| TS23 | 82hex |
| TS24 | 82hex |
| TS25 | 83hex |
| TS26 | 83hex |
| TS27 | 83hex |
| TS28 | 83hex |
| TS29 | 83hex |
| TS30 | 83hex |
| TS31 | 83hex |
| TS32 | 83hex |

TS1–TS8: LO-ODU2#5
TS9–TS16: LO-ODU2#6
TS17–TS24: LO-ODU2#7
TS25–TS32: LO-ODU2#8

TRANSFER APPARATUS AND TRANSFER METHOD

CROSS-REFERENCE TO RELATED APPLICATION

This application is based upon and claims the benefit of priority of the prior Japanese Patent Application No. 2014-008714, filed on Jan. 21, 2014, the entire contents of which are incorporated herein by reference.

FIELD

The embodiments discussed herein are related to a transfer apparatus and a transfer method.

BACKGROUND

An Optical Transport Network (OTN) transfer method defined in the International Telecommunication Union-Telecommunication Standardization Sector (ITU-T) G.709 specification is a method by which client signals flowing into an optical network are stored into and transferred as an Optical channel Transport Unit (OTU). In addition to a payload storing the client signals therein, an OTU stores therein an overhead (OH) of an Optical channel Payload Unit (OPU) and an OH of an Optical channel Data Unit (ODU).

According to the OTN transfer method, it is possible to arrange a plurality of types of client signals having mutually-different transfer rates to be stored into a single signal. A plurality of types of OTUs are defined. For example, it is possible to arrange client signals up to approximately 1.25 Gbps to be stored into an OTU0 and to arrange client signals up to approximately 2.5 Gbps to be stored into an OTU1. Further, it is possible to arrange client signals up to approximately 10 Gbps to be stored into an OTU2, to arrange client signals up to approximately 40 Gbps to be stored into an OTU3, and to arrange client signals up to approximately 100 Gbps to be stored into an OTU4. Each of the OTUs is able to store a plurality of types of ODUs therein.

As for the plurality of types of ODUs, for example, it is possible to arrange client signals up to approximately 1.25 Gbps to be stored into an ODU0 and to arrange client signals up to approximately 2.5 Gbps to be stored into an ODU1. Further, it is possible to arrange client signals up to approximately 10 Gbps to be stored into an ODU2, to arrange client signals up to approximately 40 Gbps to be stored into an ODU3, and to arrange client signals up to approximately 100 Gbps to be stored into an ODU4.

Each of the ODUs is configured to be able to store therein one or more ODUs at a lower level. For example, an ODU4 is able to store therein one or more ODUs selected from a group made up of ODU0s, ODU1s, ODU2s, and ODU3s, whereas an ODU3 is able to store therein one or more ODUs selected from a group made up of ODU0s, ODU1s, and ODU2s. In addition, each of the ODUs is configured so as to implement a multi-stage method by which each ODU is able to store therein ODUs positioned at lower levels that are nested on multiple stages. In this situation, an ODU storing therein one or more ODUs positioned at one or more lower levels will be referred to as a High-Order ODU (HO-ODU). In contrast, an ODU storing therein no ODUs positioned at lower levels will be referred to as a Low-Order ODU (LO-ODU). An ODU4 implementing the multi-stage method is obtained by, for example, multiplexing together two HO-ODU2s each of which stores therein eight LO-ODU0s and two HO-ODU3s each of which stores therein four LO-ODU2s.

Further, a separating unit included in a transfer apparatus compliant with an OTN is configured to extract LO-ODU data from HO-ODUs in an OTU received from the OTN. FIG. 16 is a drawing for explaining an exemplary operation to extract LO-ODU data from HO-ODUs in an OTU. In the present example, for the sake of convenience in the explanation, the OTU is assumed to be an OTU4. The OTU4 stores therein an ODU4, whereas the ODU4 stores therein HO-ODU3s (#1, #2) and HO-ODU2s (#1, #2). Further, the HO-ODU3 (#1) stores therein LO-ODU2s (#1 to #4), while the HO-ODU3 (#2) stores therein LO-ODU2s (#5 to #8). The HO-ODU2 (#1) stores therein LO-ODU0s (#1 to #8), while the HO-ODU2 (#2) stores therein LO-ODU0s (#1 to #8).

A separating unit 100 illustrated in FIG. 16 includes an ODU4 separating unit 101, two ODU3 separating units 102, eight ODU2 separating units 103, two ODU3 processing units 104, eight ODU2 processing units 105, and a selector 106.

The ODU4 separating unit 101 is configured to extract the HO-ODU3s and the HO-ODU2s from the HO-ODU4 and also to extract High-Order Multiplex Structure Identifier (HO-MSI) information indicating a mapping configuration on the inside of the HO-ODU4. The HO-MSI information of the HO-ODU4 is configured with 80 Tributary Slots (TSs) and manages MSI information indicating a mapping configuration of all the LO-ODUs included in the ODU4 in units of TSs. Further, each of the TSs is configured to identify a payload region storing therein the data of a corresponding one of the LO-ODUs included in the OTU. In other words, each of the TSs is configured to identify the LO-ODU stored in a corresponding payload region.

Each of the ODU3 separating units 102 is configured to extract the LO-ODU2s from a corresponding one of the HO-ODU3s extracted by the ODU4 separating unit 101 and to extract Low-Order Multiplex Structure Identifier (LO-MSI) information of the HO-ODU3. The LO-MSI information of each of the HO-ODU3s is configured with 32 TSs and manages the MSI information of all the LO-ODUs included in the ODU3, in units of TSs.

Each of the ODU2 separating units 103 is configured to extract the LO-ODU0s from a corresponding one of the HO-ODU2s extracted by the ODU4 separating unit 101 and to extract the LO-MSI information of the HO-ODU2. The LO-MSI information of each of the HO-ODU2s is configured with 8 TSs and manages the MSI information of all the LO-ODUs in the ODU2, in units of TSs.

Each of the ODU3 separating units 102 is provided with a different one of the ODU3 processing units 104. Each of the ODU3 processing units 104 is configured to monitor an OH or the like in the corresponding HO-ODU3 and to extract data of the LO-ODU2s included in the HO-ODU3, for each MSI value in units of TSs. Each of the ODU2 separating units 103 is provided with a different one of the ODU2 processing units 105. Each of the ODU2 processing units 105 is configured to monitor an OH or the like in the corresponding HO-ODU2 and to extract data of the LO-ODU0s included in the HO-ODU2, for each MSI value in units of TSs.

Next, an example of an operation performed by the separating unit 100 will be explained. The ODU4 separating unit 101 extracts the HO-ODU3s (#1, #2) and the HO-ODU2s (#1, #2) from the HO-ODU4, also extracts the HO-MSI information of the HO-ODU4 corresponding to the 80 TSs, and further informs the selector 106 of the extracted HO-MSI information.

An ODU3 separating unit 102A extracts the LO-ODU2s (#1 to #4) from the HO-ODU3 (#1) and also extracts the LO-MSI information of the HO-ODU3 (#1) corresponding to the 32 TSs. Further, the ODU3 separating unit 102A informs an ODU3 processing unit 104A corresponding to the ODU3 separating unit 102A of the LO-MSI information. FIG. 17A illustrates the LO-MSI information corresponding to the ODU3 separating unit 102A. TSs 1 to 8 correspond to the LO-ODU2 (#1) and the MSI values thereof are each "80hex". TSs 9 to 16 correspond to the LO-ODU2 (#2) and the MSI values thereof are each "81hex". Further, TSs 17 to 24 correspond to the LO-ODU2 (#3) and the MSI values thereof are each "82hex". TSs 25 to 32 correspond to the LO-ODU2 (#4) and the MSI values thereof are each "83hex". The "hex" indicates a hexadecimal expression.

Further, an ODU3 separating unit 102B extracts LO-ODU2s (#5 to #8) from the HO-ODU3 (#2) and also extracts the LO-MSI information of the HO-ODU3 (#2) corresponding to the 32 TSs. Further, the ODU3 separating unit 102B informs an ODU3 processing unit 104B corresponding to the ODU3 separating unit 102B of the LO-MSI information. FIG. 17B illustrates the LO-MSI information corresponding to the ODU3 separating unit 102B. TSs 1 to 8 correspond to the LO-ODU2 (#5) and the MSI values thereof are each "80hex". TSs 9 to 16 correspond to the LO-ODU2 (#6) and the MSI values thereof are each "81hex". TSs 17 to 24 correspond to the LO-ODU2 (#7) and the MSI values thereof are each "82hex". TSs 25 to 32 correspond to the LO-ODU2 (#8) and the MSI values thereof are each "83hex".

An ODU2 separating unit 103A extracts the LO-ODU0s (#1 to #8) from the HO-ODU2 (#1) and also extracts the LO-MSI information of the HO-ODU2 (#1) corresponding to the 8 TSs. Further, the ODU2 separating unit 103A informs an ODU2 processing unit 105A corresponding to the ODU2 separating unit 103A of the LO-MSI information. Further, an ODU2 separating unit 103B extracts the LO-ODU0s (#1 to #8) from the HO-ODU2 (#2) and also extracts the LO-MSI information of the HO-ODU2 (#2) corresponding to the 8 TSs. Further, the ODU2 separating unit 103B informs an ODU2 processing unit 105B corresponding to the ODU2 separating unit 103B of the LO-MSI information.

On the basis of the LO-MSI information received from the ODU3 separating unit 102A, an ODU3 processing unit 104A extracts data of the LO-ODU2s (#1 to #4) from the LO-ODU3 (#1). After that, the ODU3 processing unit 104A outputs the data of the LO-ODU2s (#1 to #4) to the selector 106. Further, on the basis of the LO-MSI information received from the ODU3 separating unit 102B, the ODU3 processing unit 104B extracts data of the LO-ODU2s (#5 to #8) from the LO-ODU3 (#2). After that, the ODU3 processing unit 104B outputs the data of the LO-ODU2s (#5 to #8) to the selector 106.

On the basis of the LO-MSI information received from the ODU2 separating unit 103A, the ODU2 processing unit 105A extracts data of the LO-ODU0s (#1 to #8) from the LO-ODU2 (#1). After that, the ODU2 processing unit 105A outputs the data of the LO-ODU0s (#1 to #8) to the selector 106.

Further, on the basis of the LO-MSI information received from the ODU2 separating unit 103B, the ODU2 processing unit 105B extracts data of the LO-ODU0s (#1 to #8) from the LO-ODU2 (#2). After that, the ODU2 processing unit 105B outputs the data of the LO-ODU0s (#1 to #8) to the selector 106. The selector 106 is able to output the data of the LO-ODU2s (#1 to #8), the LO-ODU0s (#1 to #8) in the HO-ODU2 (#1), the LO-ODU0s (#1 to #8) in the HO-ODU2 (#2), i.e., the data of the LO-ODUs in the ODU4 corresponding to the 80 TSs.

Patent Document 1: Japanese Laid-open Patent Publication No. 2011-146917

When the data of the LO-ODUs is output from the ODU4, because the data of the LO-ODUs corresponding to the 80 TSs is to be output from the ODU4, it is sufficient to provide the transfer apparatus with ODU processing units configured to process the data corresponding to the 80 TSs. However, in consideration of patterns of combinations of the plurality of types of ODUs that can be stored in the ODU4, the transfer apparatus provides for an ODU processing unit 104 (105) for each of the ODU3 separating units 102 and the ODU2 separating units 103. As a result, the transfer apparatus provides for the ODU processing units 104 and 105 corresponding to 144 TSs at maximum, which are namely ODU3 processing units (64 TSs) corresponding to two HO-ODU3s and ODU2 processing units (80 TS) corresponding to ten HO-ODU2s. Consequently, the transfer apparatus includes a large number of ODU processing units that are not used, which makes the circuit scale large and increases the electric power consumption.

SUMMARY

According to an aspect of the embodiments, a transfer apparatus includes a first extracting unit, a converting unit and a second extracting unit. The first extracting unit extracts, from a third signal storing therein a second signal that further stores therein a first signal, first identification information that corresponds to the second signal and that identifies the first signal for each first signal. The converting unit converts the first identification information that corresponds to the second signal and that identifies each first signal into second identification information that corresponds to the third signal and that identifies each first signal. The second extracting unit extracts the first signal from the third signal, on a basis of the second identification information resulting from the conversion by the converting unit.

According to another aspect of the embodiments, a transfer apparatus includes a first extracting unit, a judging unit, a changing unit and a second extracting unit. The first extracting unit extracts, from a third signal storing therein a second signal that further stores therein a first signal, identification information that corresponds to the third signal and that identifies the first signal for each first signal. The judging unit judges whether a change is detected in either a configuration of the signals or the identification information. The changing unit changes, when the change is detected in either the configuration of the signals or the identification information, either the identification information corresponding to the first signal in which the change is detected or the identification information related to the identification information in which the change is detected, to unused identification information. The second extracting unit extracts the first signal from the third signal, on a basis of the identification information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 3A and 3B are a drawing for explaining an example of a mapping configuration of an Optical channel Transport Unit (OTU) 4;

FIGS. 5A and 5B are a drawing for explaining an example of Low-Order Multiplex Structure Identifier (LO-MSI) information extracted by each Optical channel Data Unit (ODU) 3 separating unit;

FIG. 10 is a drawing for explaining an exemplary operation to extract a Payload Type (PT) and an ODU state from HO-MSI information;

FIG. 11 is a drawing for explaining an exemplary operation to convert MSI values corresponding to OPU2s and OPU3s into MSI values corresponding to an OPU4;

FIGS. 17A and 17B are a drawing for explaining an example of LO-MSI information extracted by ODU3 separating units.

DESCRIPTION OF EMBODIMENTS

Preferred embodiments of the present invention will be explained with reference to accompanying drawings.

The present disclosure is not limited to the exemplary embodiments. Any of the exemplary embodiments described below may be carried out in combination as necessary, as long as the combination causes no contradiction.

[a] First Embodiment

Figure 1:
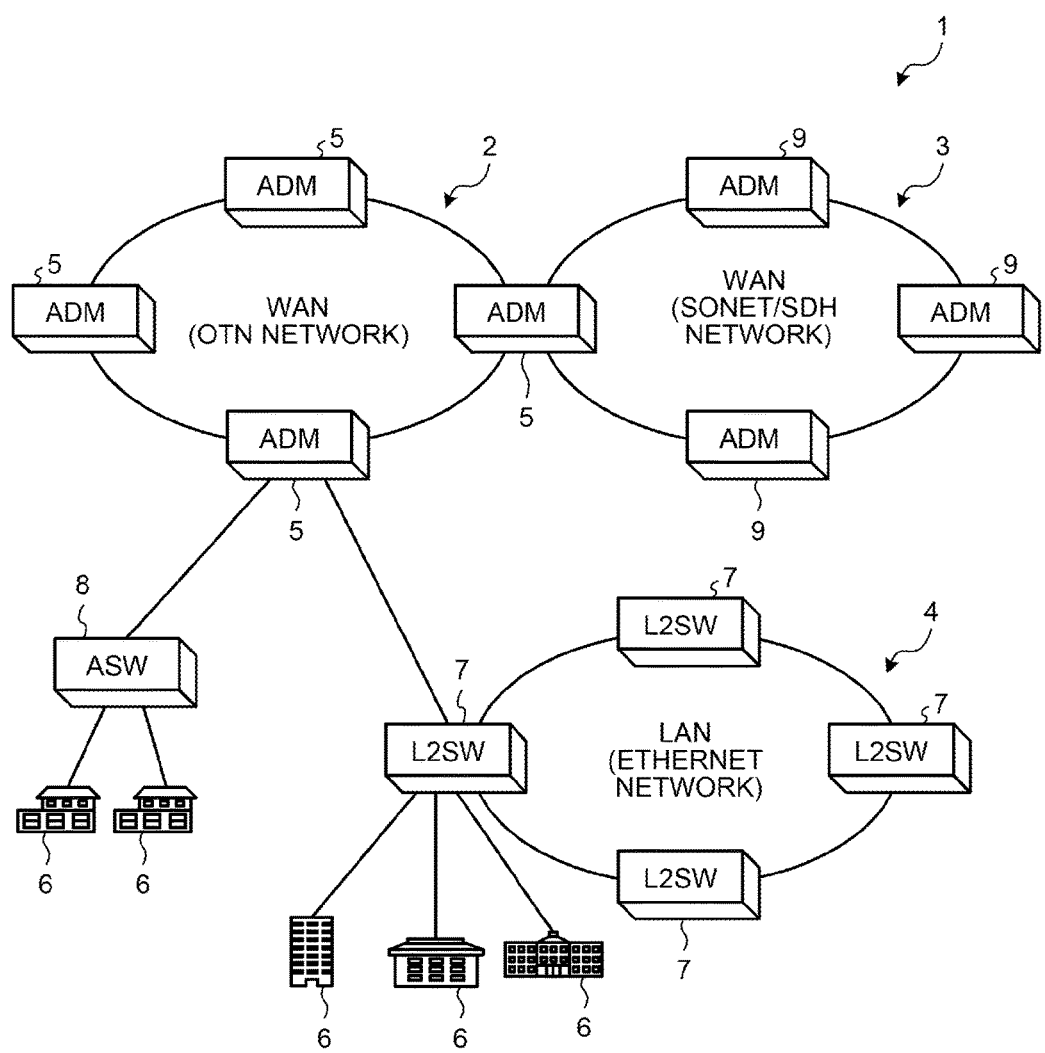
FIG. 1 is a drawing for explaining an example of a transfer system according to a first embodiment.

FIG. 1 is a drawing for explaining an example of a transfer system according to a first embodiment. A transfer system 1 illustrated in FIG. 1 includes: a Wide Area Network (WAN) 2 on an Optical Transport Network (OTN) side; a WAN 3 on a Synchronous Optical Network/Synchronous Digital Hierarchy (Sonet/SDH) side; and a Local Area Network (LAN) 4 on an Ethernet (registered trademark) side. A plurality of optical wavelength multiplexers called Add Drop Multiplexers (hereinafter, simply "ADMs") 5 each serving as a transfer apparatus are connected to the WAN 2 on the OTN side. A plurality of ADMs 9 are connected to the WAN 3 on the Sonet/SDH side.

A plurality of Layer 2 switches (L2SWs) 7 connected to clients 6 are connected to the LAN 4. Any of the ADMs 5 in the WAN 2 on the OTN side can be connected to any of the L2SWs 7 in the LAN 4 or to an Aggregate Switch (ASW) 8, so as to relay communication between the clients 6 and the WAN 2.

Figure 2:
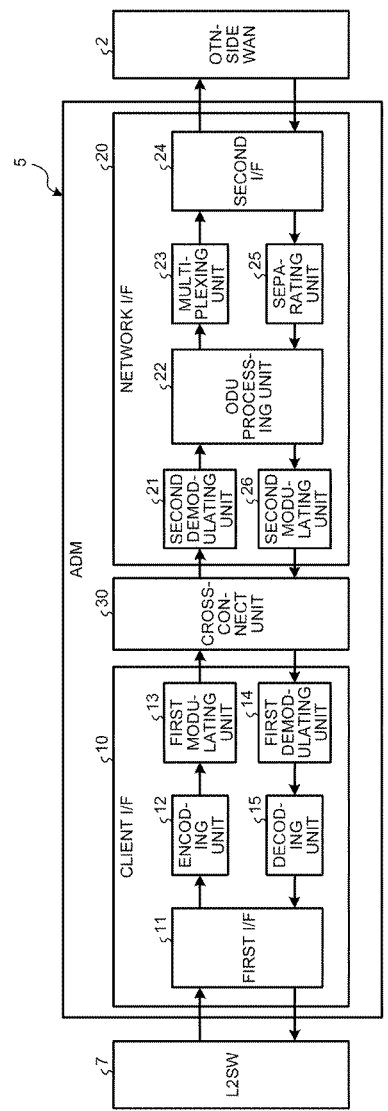
FIG. 2 is a block diagram of an example of Add Drop Multiplexers (ADMs) according to the first embodiment.

FIG. 2 is a block diagram of an example of the ADMs 5 according to the first embodiment. The ADM 5 illustrated in FIG. 2 includes a client interface (I/F) 10, a network I/F 20, and a cross-connect unit 30. The client I/F 10 is an interface that is in charge of communication with any of the L2SWs 7 or the ASW 8. The network I/F 20 is an interface that is in charge of communication with the WAN 2 on the OTN side. The cross-connect unit 30 is a switch that switches the connections for the communication between the client I/F 10 and the network I/F 20, between client I/F's 10, and between network I/F's 20.

The client I/F 10 includes a first I/F 11, an encoding unit 12, a first modulating unit 13, a first demodulating unit 14, and a decoding unit 15. The first I/F 11 is, for example, an interface that is in charge of communication with the ASW 8 or any of the L2SWs 7. The encoding unit 12 is configured to monitor the inflow of client signals from the ASW 8 or any of the L2SWs 7 via the first I/F 11 and to arrange the data of the client signals into frames within an LO-ODU, on the basis of the result of the monitoring. The first modulating unit 13 is configured to modulate the data in the LO-ODU into internal signals and to transfer the modulated internal signals to the cross-connect unit 30.

The first demodulating unit 14 is configured to demodulate the internal signals received from the cross-connect unit 30 into LO-ODU data. The decoding unit 15 is configured to decode the LO-ODU data into client signals and to output the client signals to the L2SWs 7 on the client 6 side via the first I/F 11.

The network I/F 20 includes a second demodulating unit 21, an ODU processing unit 22, a multiplexing unit 23, a second I/F 24, a separating unit 25, and a second modulating unit 26. The second demodulating unit 21 is configured to demodulate internal signals received from the cross-connect unit 30 into LO-ODU data. The ODU processing unit 22 is configured to monitor various types of signals related to detections, insertions, and the like of OHs and the like in ODUs. The multiplexing unit 23 is configured to generate an OTU obtained by multiplexing a plurality of LO-ODUs on the basis of the result of the monitoring. In this situation, the OTU is represented by signals according to the multi-stage method that are obtained by, for example, multiplexing the plurality of LO-ODUs so as to be nested in HO-ODUs on multiple stages. The second I/F 24 is an interface that is in charge of communication with the WAN 2 on the OTN side. The multiplexing unit 23 is configured to generate the OTU by multiplexing the LO-ODUs and to output the generated OTU via the second I/F 24.

The separating unit 25 is configured to extract LO-ODU data from the HO-ODUs in the OTU via the second I/F 24. The ODU processing unit 22 is configured to extract the data of the LO-ODUs extracted by the separating unit 25. The second modulating unit 26 is configured to modulate the LO-ODU data into internal signals and to transfer the modulated internal signals to the cross-connect unit 30.

FIGS. 3A and 3B are a drawing for explaining an example of a mapping configuration of an OTU4. The OTU4 illustrated in FIG. 3A is configured with HO-ODU4 of the OTU4. The HO-ODU4 stores therein two HO-ODU3s (#1, #2) and two HO-ODU2s (#1, #2). The HO-ODU3 (#1) stores therein four LO-ODU2s (#1 to #4). Further, the HO-ODU3 (#2) stores therein four LO-ODU2s (#5 to #8). The HO-ODU2 (#1) stores therein eight LO-ODU0s (#1 to #8). Further, the HO-ODU2 (#2) stores therein eight LO-ODU0s (#1 to #8).

Further, the OTU4 illustrated in FIG. 3B is configured with HO-ODU4s of the OTU4. The HO-ODU4 stores therein ten HO-ODU2s (#1 to #10). Each of the HO-ODU2s (#1 to #10) stores therein eight LO-ODU0s (#1 to #8).

Figure 4:
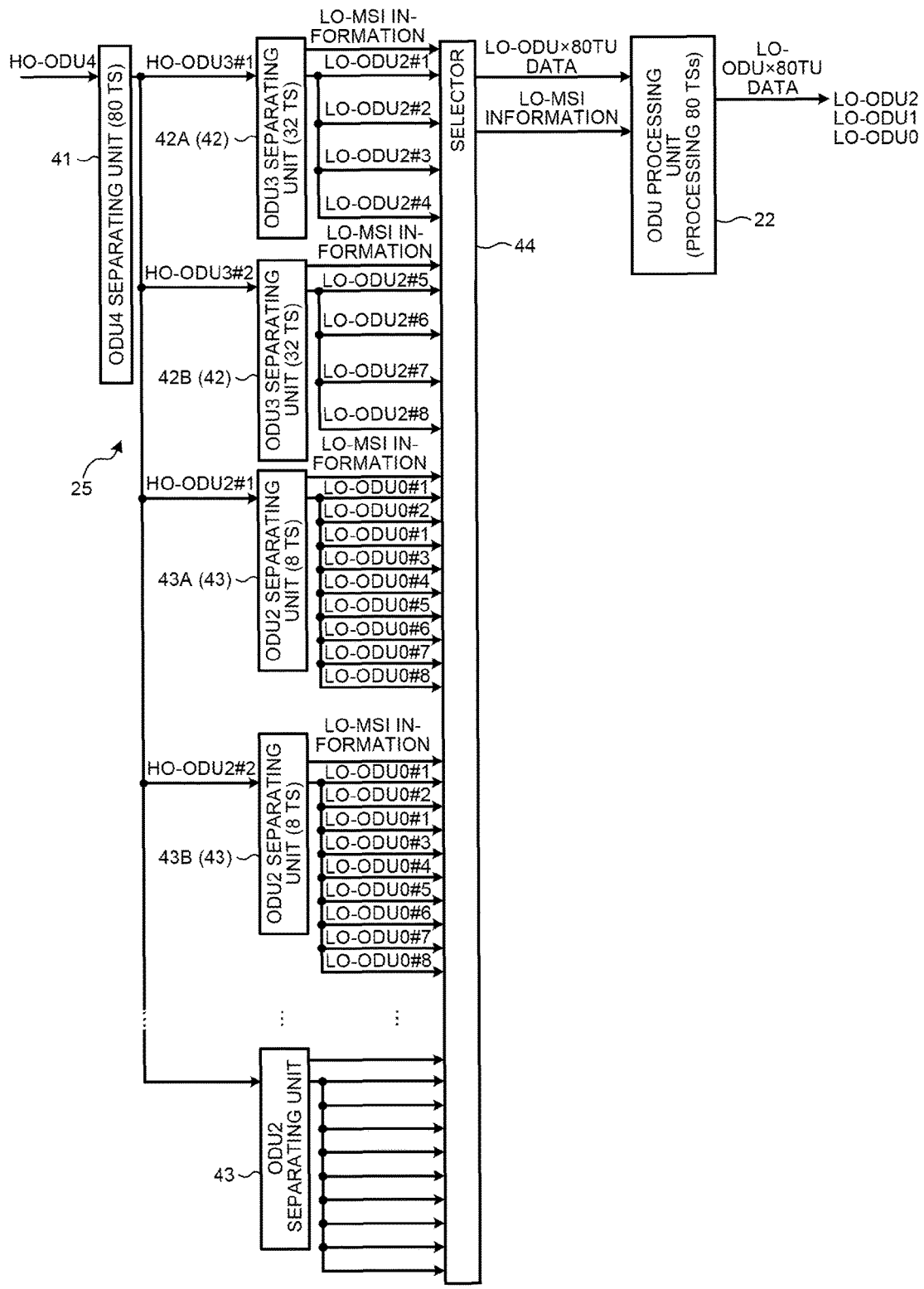
FIG. 4 is a drawing for explaining an exemplary operation performed by the ADM according to the first embodiment to extract LO-ODU data from HO-ODUs.

FIG. 4 is a drawing for explaining an exemplary operation performed by the ADM 5 according to the first embodiment to extract LO-ODU data from HO-ODUs. The separating unit 25 illustrated in FIG. 4 includes an ODU4 separating unit 41, two ODU3 separating units 42, ten ODU2 separating units 43, and a selector 44. The ODU4 separating unit 41 extracts an HO-ODU3 (#1), an HO-ODU3 (#2), an HO-ODU2 (#1), and an HO-ODU2 (#2) from an HO-ODU4. An ODU3 separating unit 42A extracts LO-ODU2s (#1 to #4) from the HO-ODU3 (#1) extracted by the ODU4 separating unit 41 and also extracts LO-MSI information of the HO-ODU3 (#1). The ODU3 separating unit 42A outputs the data of the LO-ODU2s (#1 to #4) in the HO-ODU3 (#1) to the selector 44 and also informs the selector 44 of the LO-MSI information of the ODU3 (#1).

An ODU3 separating unit 42B extracts LO-ODU2s (#5 to #8) from the HO-ODU3 (#2) extracted by the ODU4 separating unit 41 and also extracts LO-MSI information of the HO-ODU3 (#2). The ODU3 separating unit 42B outputs the data of the LO-ODU2s (#5 to #8) in the HO-ODU3 (#2) to the selector 44 and also informs the selector 44 of the LO-MSI information of the HO-ODU3 (#2).

An ODU2 separating unit 43A extracts LO-ODU0s (#1 to #8) from the HO-ODU2 (#1) extracted by the ODU4 separating unit 41 and also extracts LO-MSI information of the HO-ODU2 (#1). The ODU2 separating unit 43A outputs the data of the LO-ODU0s (#1 to #8) in the HO-ODU2 (#1) to the selector 44 and also informs the selector 44 of the LO-MSI information of the HO-ODU2 (#1).

An ODU2 separating unit 43B extracts LO-ODU0s (#1 to #8) from the HO-ODU2 (#2) extracted by the ODU4 separating unit 41 and also extracts LO-MSI information of the HO-ODU2 (#2). The ODU2 separating unit 43B outputs the data of the LO-ODU0s (#1 to #8) in the HO-ODU2 (#2) to the selector 44 and also informs the selector 44 of the LO-MSI information of the HO-ODU2 (#2).

On the basis of the pieces of LO-MSI information, the selector 44 selectively outputs the LO-ODU data corresponding to 80 Tributary Slots (TSs) and transfers the LO-ODU data to the ODU processing unit 22. The ODU processing unit 22 outputs the LO-ODU data corresponding to the 80 TSs in the ODU4 that were selectively output by the selector 44.

It is sufficient to provide the ADM 5 according to the first embodiment with the single ODU processing unit 22 corresponding to the ODU4 separating unit 41, and there is no need to provide the ADM 5 with an ODU processing unit for each of the ODU separating units 42 and 43 included in the separating unit 25. The ADM 5 is able to extract the LO-ODU data corresponding to the 80 TSs in the ODU4, by employing the single ODU processing unit 22. As a result, it is possible to reduce the ODU processing unit by approximately 45% from 144 TSs to 80 TSs. It is therefore possible to reduce the circuit scale thereof and also possible to reduce the electric power consumption thereof.

According to the first embodiment described above, however, MSI values of the LO-ODUs are not provided through mutually the same transfer paths but are provided through various transfer paths. Accordingly, there may be a situation where the MSI values corresponding to the TSs of the LO-ODU0s (#1 to #4) in the ODU3 (#1) coincide with the MSI values corresponding to the TSs of the LO-ODU0s (#5 to #8) in the ODU3 (#2). FIGS. 5A and 5B are a drawing for explaining an example of the LO-MSI information extracted by each of the ODU3 separating units 42A (and 42B). The MSI values corresponding to the TSs of the LO-ODU0s (#1 to #4) in the ODU3 (#1) illustrated in FIG. 5A are duplicates of the MSI values corresponding to the TSs of the LO-ODU0s (#5 to #8) in the ODU3 (#2) illustrated in FIG. 5B. For example, the MSI value of the LO-ODU0 (#1) in the ODU3 (#1) and the MSI value of the LO-ODU0 (#5) in the ODU3 (#2) are duplicates, both being "80hex".

Because the MSI values corresponding to the TSs of the LO-ODU0 (#1) and the LO-ODU0 (#5) are the same as each other, the ODU processing unit 22 determines that the LO-ODU0 (#1) and the LO-ODU0 (#5) are the same ODU. On the basis of the specification under the ITU-T G.709/Y.1331, the ODU processing unit 22 determines that LO-ODUs having mutually the same MSI value are the same ODU. Thus, because of the MSI value "80hex" corresponding to the sixteen TSs, the ODU processing unit 22 determines that the LO-ODU0 (#1) and the LO-ODU0 (#5) are the same LO-ODU and erroneously judges the LO-ODU0s to be LO-ODU0 flex 16.

To cope with this situation, an exemplary embodiment of an ADM 5A provided with an MSI value converting process configured to prevent MSI values from being duplicated between mutually-different LO-ODUs will be explained below as a second embodiment.

[b] Second Embodiment

Figure 6:
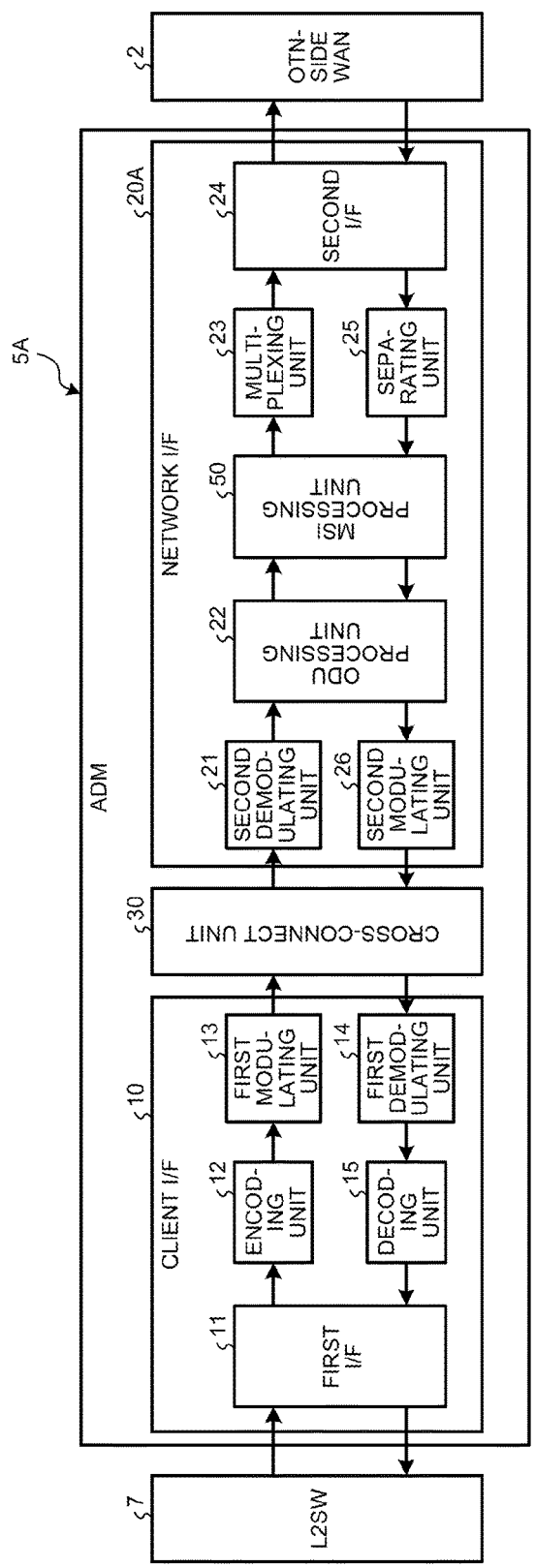
FIG. 6 is a block diagram of an example of an ADM according to second embodiment.

FIG. 6 is a block diagram of an example of the ADM 5A according to the second embodiment. Some of the constituent elements that are the same as those in the ADM 5 illustrated in FIG. 2 will be referred to by using the same reference characters, and explanation of the same configuration and operation will be omitted. The ADM 5A illustrated in FIG. 6 is different from the ADM 5 illustrated in FIG. 2 in that an MSI processing unit 50 is provided between the ODU processing unit 22 and the separating unit 25 within a network I/F 20A.

Figure 7:
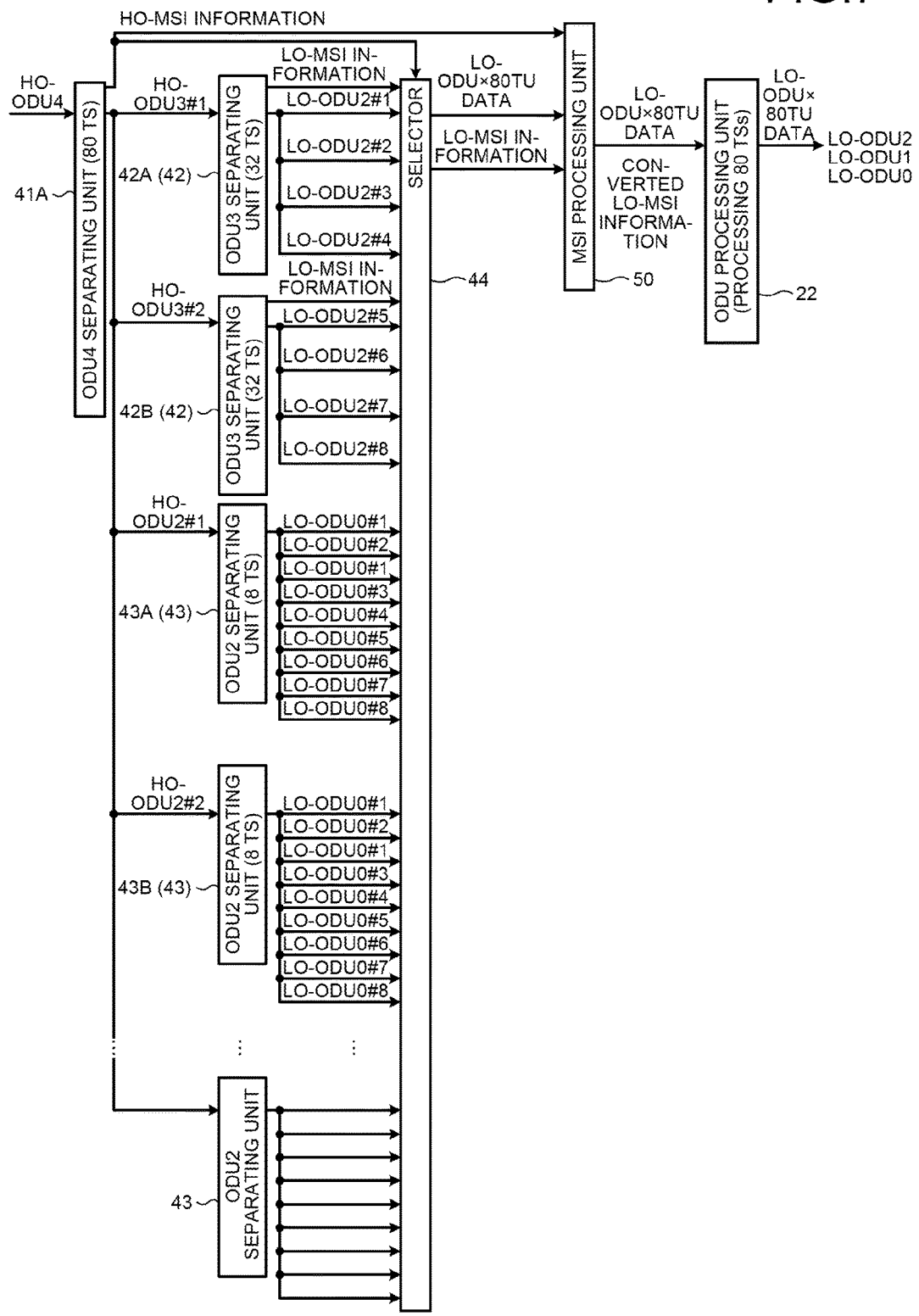
FIG. 7 is a drawing for explaining an exemplary operation performed by an ADM according to the second embodiment to extract LO-ODU data from HO-ODUs.

FIG. 7 is a drawing for explaining an exemplary operation performed by the ADM 5A according to the second embodiment to extract LO-ODU data from HO-ODUs. An ODU4 separating unit 41A illustrated in FIG. 7 extracts the HO-ODU3 (#1), the HO-ODU3 (#2), the HO-ODU2 (#1), and the HO-ODU2 (#2) from the HO-ODU4 and also informs the selector 44 and the MSI processing unit 50 of the HO-MSI information in the HO-ODU4.

Figure 8:
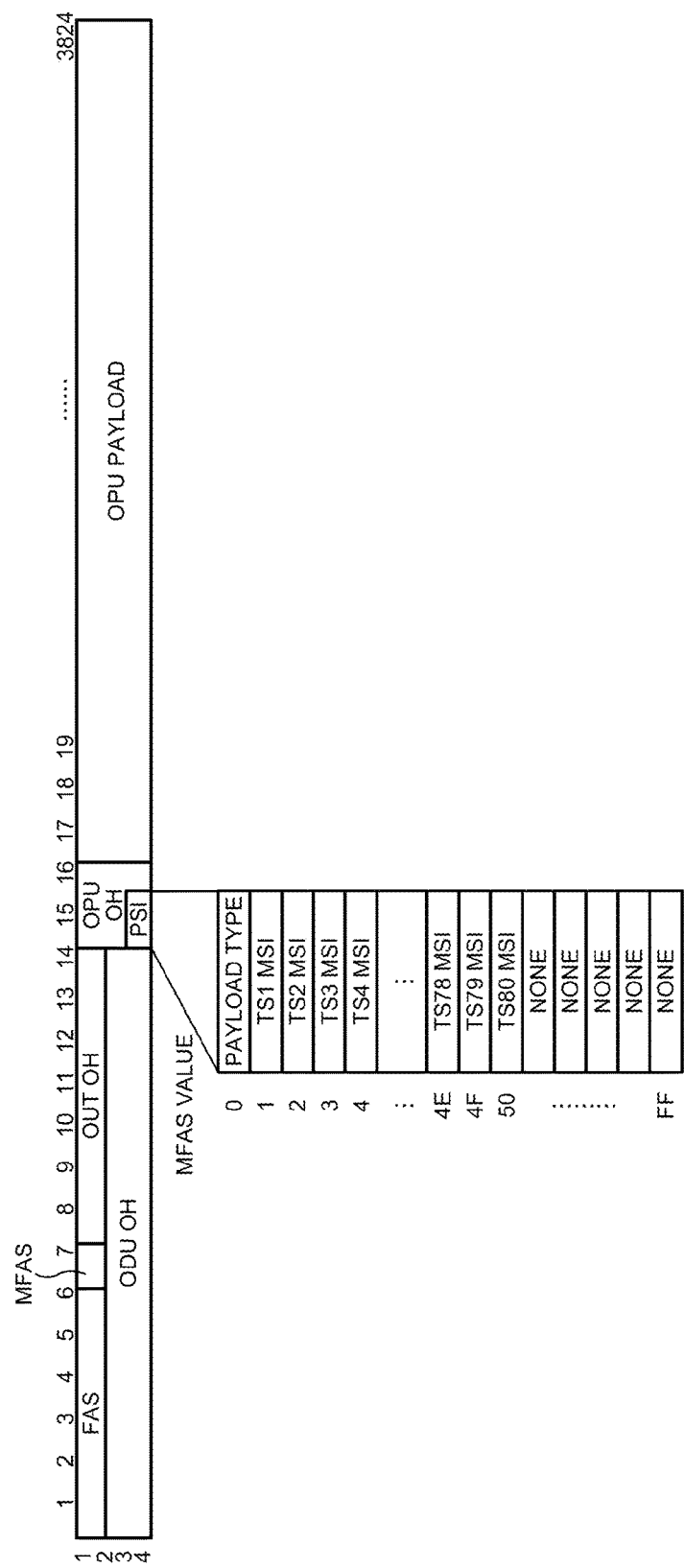
FIG. 8 is a drawing for explaining an exemplary operation to extract MSI information from HO-ODUs.

FIG. 8 is a drawing for explaining an exemplary operation to extract the HO-MSI information from the HO-ODUs. The OTU4 illustrated in FIG. 8 includes an ODUOH, an OPUOH, and an OPU payload. The OPUOH includes a Payload Structure Identifier (PSI), and the PSI stores therein the payload type and MSI values corresponding to units of TSs. The ODU4 separating unit 41A extracts the payload type and the HO-MSI information of the ODU4, from the PSI illustrated in FIG. 8.

An ODU3 separating unit 42A extracts the LO-ODU2s (#1 to #4) from the HO-ODU3 (#1) extracted by the ODU4 separating unit 41A and also extracts the LO-MSI information of the HO-ODU3 (#1). The ODU3 separating unit 42A then outputs the data of the LO-ODU2s (#1 to #4) from the HO-ODU3 (#1) to the selector 44 and also informs the selector 44 of the LO-MSI information of the HO-ODU3 (#1).

An ODU3 separating unit 42B extracts the LO-ODU2s (#5 to #8) from the HO-ODU3 (#2) extracted by the ODU4 separating unit 41A and also extracts the LO-MSI information of the HO-ODU3 (#2). The ODU3 separating unit 42B then outputs the data of the LO-ODU2s (#5 to #8) from the HO-ODU3 (#2) to the selector 44 and also informs the selector 44 of the LO-MSI information of the HO-ODU3 (#2).

An ODU2 separating unit 43A extracts the LO-ODU0s (#1 to #8) from the HO-ODU2 (#1) extracted by the ODU4 separating unit 41A and also extracts the LO-MSI information of the HO-ODU2 (#1). The ODU2 separating unit 43A then outputs the data of the LO-ODU0s (#1 to #8) of the HO-ODU2 (#1) to the selector 44 and also informs the selector 44 of the LO-MSI information of the HO-ODU2 (#1).

An ODU2 separating unit 43B extracts the LO-ODU0s (#1 to #8) from the HO-ODU2 (#2) extracted by the ODU4 separating unit 41A and also extracts the LO-MSI information of the HO-ODU2 (#2). The ODU2 separating unit 43B then outputs the data of the LO-ODU0s (#1 to #8) from the HO-ODU2 (#2) to the selector 44 and also informs the selector 44 of the LO-MSI information of the HO-ODU2 (#2).

On the basis of the pieces of LO-MSI information, the selector 44 selectively outputs the LO-ODU data corresponding to the 80 TSs in the ODU4 and outputs the LO-ODU data to the ODU processing unit 22. The ODU processing unit 22 extracts the LO-ODU data corresponding to the 80 TSs in the ODU4 that were selectively output by the selector 44.

Figure 9:
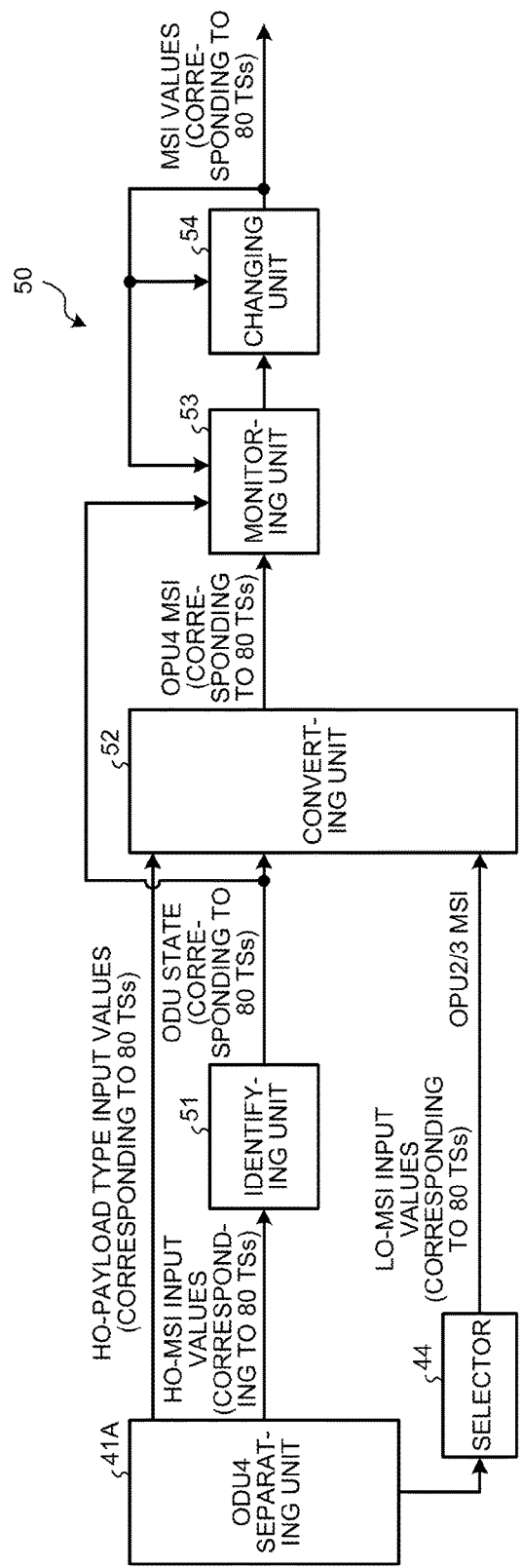
FIG. 9 is a block diagram of an example of an MSI processing unit.

FIG. 9 is a drawing for explaining an example of the MSI processing unit 50. The MSI processing unit 50 illustrated in FIG. 9 includes an identifying unit 51, a converting unit 52, a monitoring unit 53, and a changing unit 54. FIG. 10 is a drawing for explaining an exemplary operation to extract a PT and an ODU state from HO-MSI information. As illustrated in FIG. 10, on the basis of the HO-MSI Information received from the ODU4 separating unit 41A, the identifying unit 51 is configured to identify, for example, the ODU state such as the ODU4, the ODU3 (#1), the ODU3 (#2), the ODU2 (#1), and the like. The converting unit 52 is configured to identify the Payload Type (PT) received from the ODU4 separating unit 41A. In this situation, the payload type is one of the two types that are namely 1.25 Gbps/TS and 2.5 Gbps/TS.

On the basis of the payload type, the ODU state, and the LO-MSI information received from the ODU3 separating units 42 and the ODU2 separating units 43, the converting unit 52 is configured to convert the MSI values of the LO-ODUs corresponding to the OPU3s and OPU2s into MSI values of the LO-ODUs corresponding to the OPU4. The converting unit 52 converts the MSI values of the LO-ODUs corresponding to the OPU2s and OPU3s into the MSI values of the LO-ODUs corresponding to the OPU4 that correspond to the 80 TSs. FIG. 11 is a drawing for explaining an exemplary operation to convert the MSI values corresponding to the OPU2s and OPU3s into the MSI values corresponding to the OPU4. On the basis of the ODU state and the payload type, the converting unit 52 converts the MSI values corresponding to the OPU2s and OPU3s into the MSI values corresponding to the OPU4. When the ODU state is the ODU3 while the payload type is "1.25G", the converting unit 52 refers to a conversion table 200A and converts the MSI value corresponding to the OPU3s into an MSI value corresponding to the OPU4. When the ODU state is the ODU3 while the payload type is "2.5G", the converting unit 52 refers to a conversion table 200B and converts the MSI value corresponding to the OPU3s into an MSI value corresponding to the OPU4. When the ODU state is the ODU2 while the payload type is "1.25G", the converting unit 52 refers to a conversion table 200C and converts the MSI value corresponding to the OPU2s into an MSI value corresponding to the OPU4. When the ODU state is the ODU2 while the payload type is "2.5G", the converting unit 52 refers to a conversion table 200D and converts the MSI value corresponding to the OPU2s into an MSI value corresponding to the OPU4.

On the basis of the MSI values of the LO-ODUs corresponding to the OPU4 converted by the converting unit 52 and the ODU state received from the identifying unit 51, the monitoring unit 53 is configured to judge whether a change has been detected in either the LO-MSI values corresponding to the OPU4 or the ODU state. If a change has been detected in either the LO-MSI values corresponding to the OPU4 or the ODU state, the changing unit 54 obtains an unused MSI value from among the MSI values corresponding to the OPU4. The changing unit 54 then changes either the MSI value in which the change has been detected or all the MSI values corresponding to the LO-ODU having the ODU state in which the change has been detected, to the unused MSI value.

Further, when a change has been detected in either the LO-MSI values corresponding to the OPU4 or the ODU state, the monitoring unit 53 judges whether there are any duplicate MSI values between mutually-different LO-ODUs, in units of TSs. When there are duplicate MSI values between mutually-different LO-ODUs, the changing unit 54 obtains an unused MSI value from among the MSI values corresponding to the OPU4. Further, from among the duplicate MSI values, the changing unit 54 changes either the MSI value in which the change has been detected or the MSI values related to the ODU state in which the change has been detected, to the unused MSI value. As a result, with respect to the MSI values corresponding to the OPU4 that correspond to the 80 TSs, it is possible to prevent the MSI values from being duplicated between mutually-different LO-ODUs.

Figure 12:
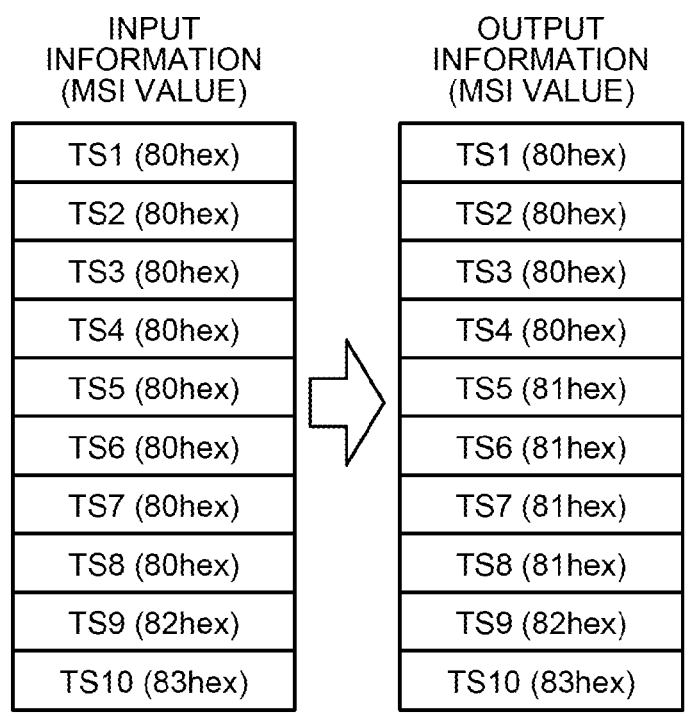
FIG. 12 is a drawing for explaining an example of an MSI conversion operation performed by an MSI processing unit.

FIG. 12 is a drawing for explaining an example of an MSI conversion operation performed by the MSI processing unit 50. For example, it is assumed that TSs 1 to 4 correspond to the LO-ODU2 (#1), that TSs 5 to 8 correspond to the LO-ODU2 (#2), that TS 9 corresponds to the LO-ODU1 (#1), and that TS 10 corresponds to the LO-ODU1 (#2). Further, it is assumed that the MSI value of the LO-ODU2 (#1) is "0x80", that the MSI value of the LO-ODU2 (#2) is "0x80", that the MSI value of the LO-ODU1 (#1) is "0x82", and that the MSI value of the LO-ODU1 (#2) is "0x83".

The monitoring unit 53 determines that the MSI value of TSs 1 to 4 corresponding to the LO-ODU2 (#1) and the MSI value of TSs 5 to 8 corresponding to the LO-ODU2 (#2) are duplicates, both being "0x80". The changing unit 54 has obtained an unused MSI value "0x81".

The changing unit 54 changes the MSI value "0x80" of TSs 5 to 8 corresponding to the LO-ODU2 (#2) to the unused MSI value "0x81". In that situation, the changing unit 54 does not change the MSI values of the other TSs besides TSs 5 to 8, and it is assumed that the MSI values of the other TSs besides TSs 5 to 8 are not affected.

Figure 13:
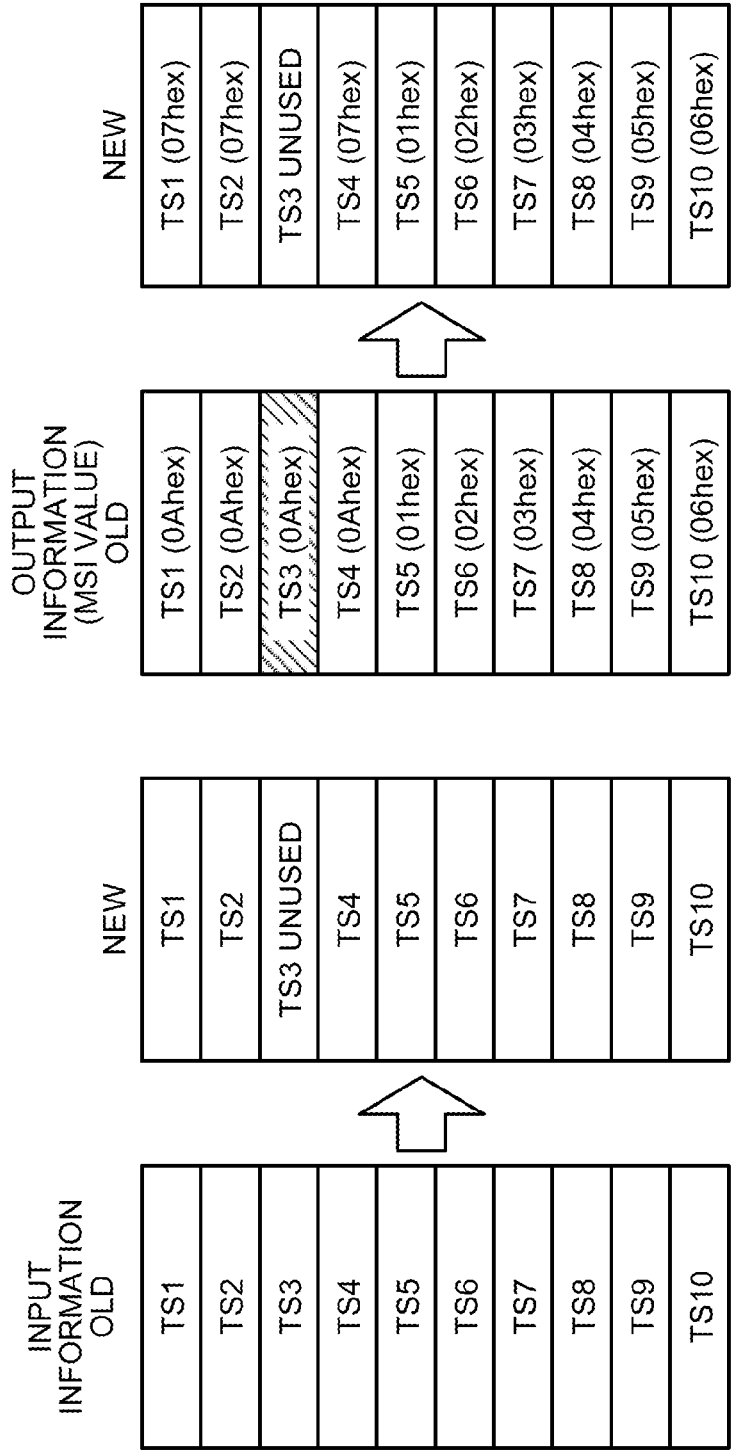
FIG. 13 is a drawing for explaining another example of the MSI conversion operation performed by the MSI processing unit.

FIG. 13 is a drawing for explaining another example of the MSI conversion operation performed by the MSI processing unit 50. For example, it is assumed that TSs 1 to 4 correspond to the LO-ODU2 (#1), that TS 5 corresponds to the LO-ODU1 (#1), that TS 6 corresponds to the LO-ODU1 (#2), and so on. Further, it is assumed that the MSI values of TSs 1 to 4 are each "0x0A", that the MSI value of TS 5 is "0x01", and that the MSI value of TS 6 is "0x02".

When having detected TS 3 being "unused", the monitoring unit 53 determines that a change has been detected in either the MSI values or the ODU state. When having detected TS 3 being "unused", the changing unit 54 changes the MSI values of TSs 1, 2, and 4 corresponding to the LO-ODU2 (#1) to which TS 3 also corresponds, each to an unused MSI value "0x07", without changing the MSI values of those other than the LO-ODU2 (#1) corresponding to TSs 1 to 4.

Figure 14:
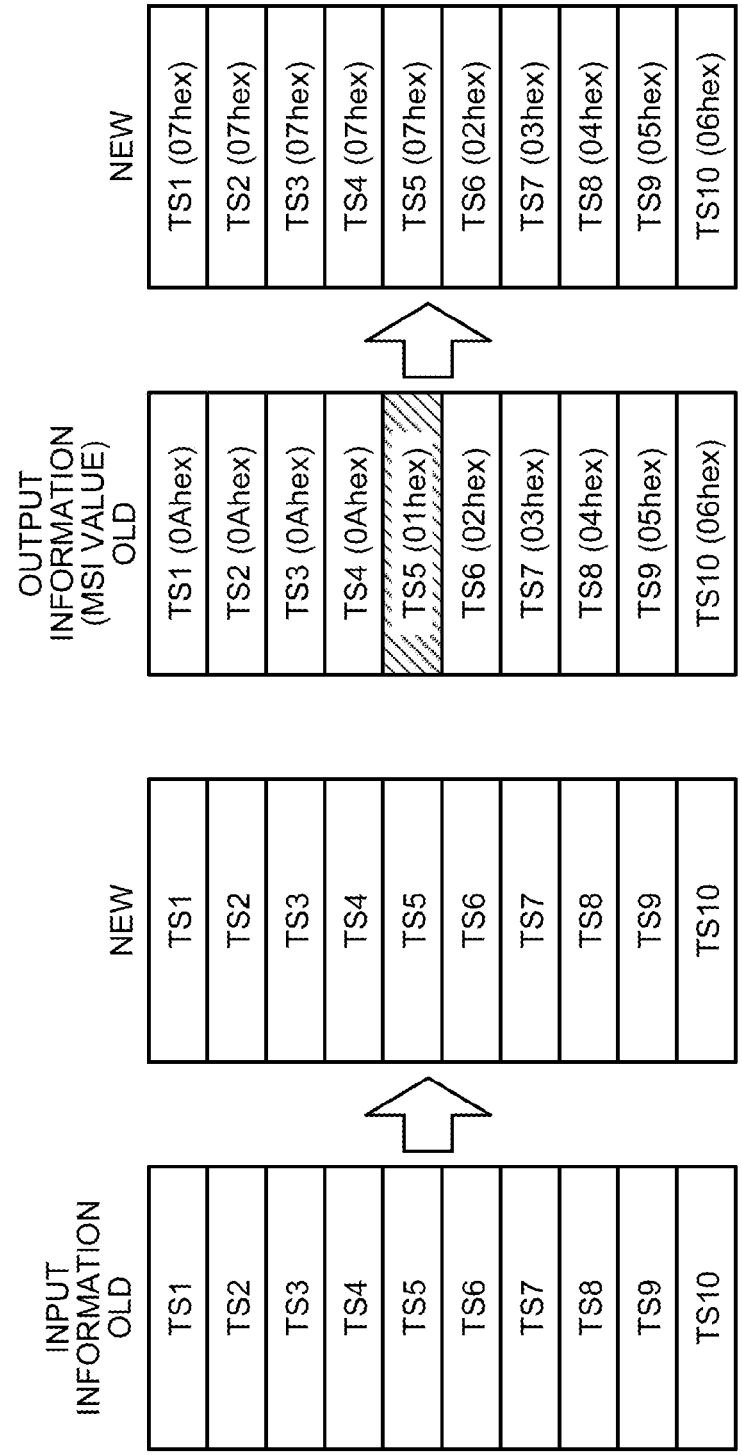
FIG. 14 is a drawing for explaining yet another example of the MSI conversion operation performed by the MSI processing unit.

FIG. 14 is a drawing for explaining yet another example of the MSI conversion operation performed by the MSI processing unit 50. For example, it is assumed that TSs 1 to 4 correspond to the LO-ODU (#1), that the MSI values of TSs 1 to 4 are each "0x0A", and that the MSI value of TS 5 is "0x01". Further, let us assume that TS 5 needs to be added to TSs 1 to 4 corresponding to LO-ODU (#1).

When TS 5 needs to be added to TSs 1 to 4 corresponding to the LO-ODU (#1), the monitoring unit 53 determines that this situation means that a change has been detected in the MSI values. When TS 5 needs to be added, the changing unit 54 changes, for example, each of the MSI values of TSs 1 to 5 to an unused MSI value "0x07", without changing the MSI values of TSs 6 to 10 besides TSs 1 to 5.

Figure 15:
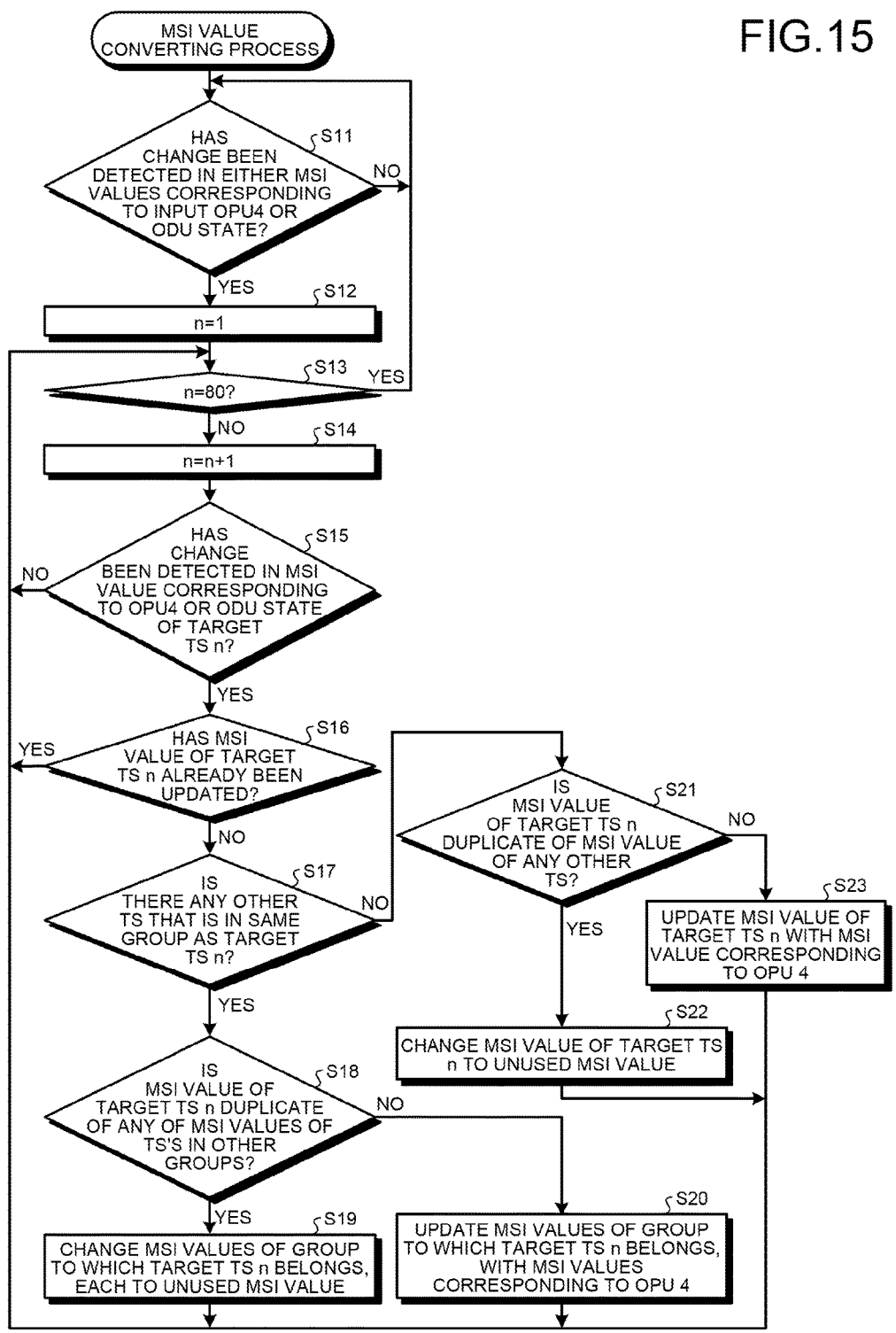
FIG. 15 is a flowchart of an example of a processing operation performed by the MSI processing unit related to an MSI value converting process.
Figure 16:
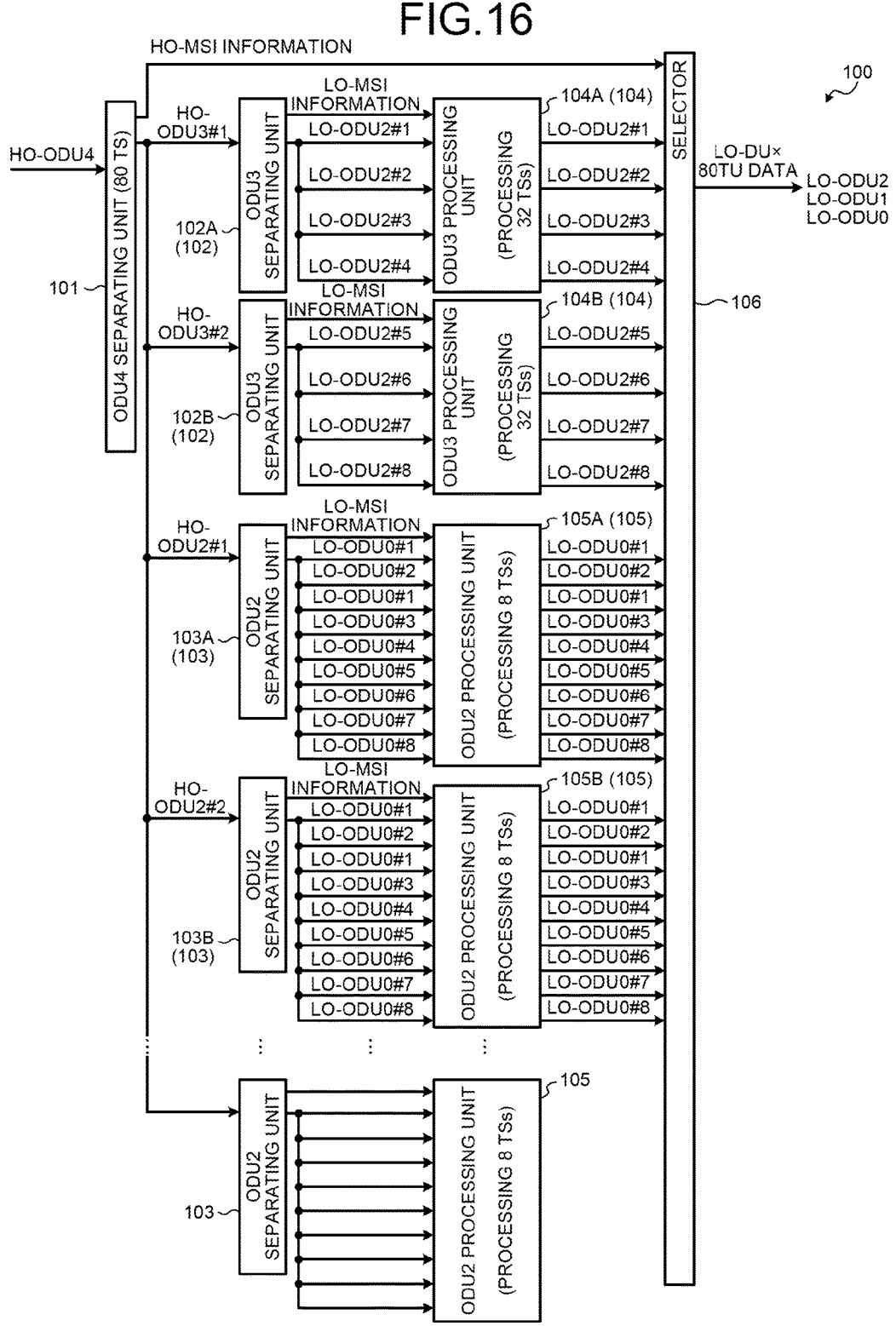
FIG. 16 is a drawing for explaining an exemplary operation to extract LO-ODU data from HO-ODUs.

Next, an operation performed by the ADM 5A according to the second embodiment will be explained. FIG. 15 is a flowchart of an example of a processing operation performed by the MSI processing unit 50 related to an MSI value converting process. In FIG. 15, the monitoring unit 53 included in the MSI processing unit 50 judges whether a change has been detected in either the MSI values of the LO-ODUs corresponding to the OPU4 or the ODU state (step S11). If a change has been detected in the MSI values of the LO-ODUs corresponding to the OPU4 or the ODU state (step S11: Yes), the monitoring unit 53 sets "n" of TS n to 1 (step S12). In this situation, "n" denotes a hexadecimal number identifying the TS. The monitoring unit 53 judges whether n=80 is satisfied (step S13). If n=80 is satisfied (step S13: Yes), the monitoring unit 53 determines that selecting each of all the TSs as a target has been completed and proceeds to step S11 where the monitoring unit 53 judges whether a change has been detected in either the MSI values corresponding to the OPU4 or the ODU state.

If n=80 is not satisfied (step S13: No), the monitoring unit 53 sets n so as to satisfy n=n+1 in order to select the next TS as a target (step S14) and judges whether a change has been detected in either the MSI value corresponding to the OPU4 or the ODU state of the target TS n (step S15). If a change has been detected in the MSI value corresponding to the OPU4 or the ODU state of the target TS n (step S15: Yes), the monitoring unit 53 judges whether the MSI value of the target TS n has already been updated (step S16).

If the MSI value of the target TS n has not been updated yet (step S16: No), the monitoring unit 53 judges whether there is any other TS that is in the same group as the target TS n (step S17). In this situation, the group to which the target TS n belongs corresponds to the LO-ODU of the target TS n. A TS that belongs to the same group corresponds to a TS that belongs to the same LO-ODU.

If there is at least one TS that belongs to the same group as the target TS n does (step S17: Yes), the monitoring unit 53 judges whether the MSI value of the target TS n is a duplicate of any of the MSI values of the TSs in the other groups (step S18). If the MSI value of the target TS n is determined to be a duplicate of the MSI value of at least one TS in another group (step S18: Yes), the changing unit 54 included in the MSI processing unit 50 changes the MSI values of the group to which the target TS n belongs, each to an unused MSI value, as illustrated in FIGS. 12 and 14 (step S19). Further, after the MSI values have each been changed to the unused MSI value, the monitoring unit 53 proceeds to step S13 where the monitoring unit 53 judges whether n=80 is satisfied.

If the MSI value of the target TS n is not a duplicate of any of the MSI values of the TSs in the other groups (step S18: No), the changing unit 54 updates the MSI values of the group to which the target TS n belongs, with MSI values corresponding to the OPU4 (step S20). Further, after the MSI values have been updated, the monitoring unit 53 proceeds to step S13 where the monitoring unit 53 judges whether n=80 is satisfied.

If there is no other TS that is in the same group as the target TS n (step S17: No), the monitoring unit 53 judges whether the MSI value of the target TS n is a duplicate of the MSI value of any other TS (step S21). If the MSI value of the target TS n is a duplicate of the MSI value of at least one other TS (step S21: Yes), the changing unit 54 changes the MSI value of the target TS n to an unused MSI value (step S22) and proceeds to step S13 where the monitoring unit 53 judges whether n=80 is satisfied.

If the MSI value of the target TS n is not a duplicate of the MSI value of any other TS (step S21: No), the changing unit 54 updates the MSI value of the target TS n with an MSI value corresponding to the OPU4 (step S23) and proceeds to step S13 where it is judged whether n=80 is satisfied.

If no change has been detected in the MSI values corresponding to the OPU4 and the ODU state of the target TS n (step S15: No), the monitoring unit 53 proceeds to step S13 where the monitoring unit 53 judges whether n=80 is satisfied. If the MSI value of the target TS n has already been updated (step S16: Yes), the monitoring unit 53 proceeds to step S13.

If a change has been detected in the MSI values corresponding to the OPU4 or the ODU state, the MSI processing unit 50 performing the MSI value converting process illustrated in FIG. 15 judges whether there is any other TS that is in the same group as the target TS n and whether the MSI value of the target TS n is a duplicate of any of the MSI values of the TSs in the other groups. Further, if the MSI value of the target TS n is a duplicate of the MSI value of at least one TS in another group, the MSI processing unit 50 changes the MSI values of the group to which the target TS n belongs, each to the unused MSI value. As a result, it is possible to avoid performing unnecessary processes, because it is possible to update only the MSI values of the group having the change, without affecting the MSI values in the other groups having no change. In addition, it is possible to prevent the MSI values from being duplicated between mutually-different LO-ODUs and to thus prevent erroneous judgments on the LO-ODUs.

If the MSI value of the target TS n is not a duplicate of any of the MSI values of the TSs in the other groups, the MSI processing unit 50 updates the MSI values of the group to which the target TS n belongs.

If there is no other TS that is in the same group as the target TS n, and also, the MSI value of the target TS n is a duplicate of the MSI value of at least one other TS, the MSI processing unit 50 changes the MSI value of the target TS n to the unused MSI value. As a result, it is possible to prevent the MSI values from being duplicated between mutually-different LO-ODUs and to thus prevent erroneous judgments on the LO-ODUs.

If there is no TS that is in the same group as the target TS n, and also, the MSI value of the target TS n is not a duplicate of the MSI value of any other TS, the MSI processing unit 50 updates the MSI value of the target TS n.

The ADM 5A according to the second embodiment is configured to cause the separating units 25 to extract the MSI values of the LO-ODUs corresponding to the OPU2s/OPU3s from the OTU 4 implementing the multi-stage method and to convert the extracted MSI values corresponding to the OPU2s/OPU3s into the MSI values corresponding to the OPU4. On the basis of the MSI values of the LO-ODUs corresponding to the OPU4, the ADM 5A causes the single ODU processing unit 22 corresponding to the OPU4 to collectively process all the LO-ODUs in the ODU4. As a result, because it is possible to collectively perform the demapping process, which is conventionally performed in sections of multiple processes, it is possible to keep small the circuit scale of the ODU processing unit 22 serving as a demapping circuit, and it is therefore possible to reduce the electric power consumption thereof.

If a change has been detected in either the LO-ODU or the MSI values, the ADM 5A changes the MSI values of the LO-ODU from which either a change thereof or a change in any of the MSI values thereof has been detected, to the unused MSI value. As a result, it is possible to prevent the MSI values from being duplicated between mutually-different LO-ODUs and to thus prevent erroneous judgments on the LO-ODUs.

In addition, because the ADM 5A uses the unused MSI value, there is no duplication of MSI values, and it is sufficient to provide the ADM 5A with the single OPU4 processing unit configured to output the LO-ODU data based on the MSI values corresponding to the 80 TSs, by using the MSI values corresponding to the ODU4. As a result, it is possible to keep the circuit scale of the ADM 5 small and to thereby suppress the electric power consumption of the entirety of the ADM 5A.

When a change has been detected in either the LO-ODU or the MSI values, the ADM 5A judges whether duplication of MSI values has been detected between mutually-different LO-ODUs, among the MSI values of the LO-ODUs corresponding to the OPU4. If duplication of MSI values has been detected between mutually-different LO-ODUs, the ADM 5A changes the MSI value in which the duplication has been detected, to the unused MSI value. As a result, it is possible to prevent the MSI values from being duplicated between mutually-different LO-ODUs and to thus prevent erroneous judgments on the LO-ODUs.

If duplication of MSI values has been detected between mutually-different LO-ODUs, the ADM 5A changes the MSI value in which a change has been detected, from among the MSI values in which the duplication has been detected. As a result, it is possible to avoid performing unnecessary processes, because the other MSI values having no change are not affected.

The ADM 5A according to the second embodiment described above uses the example of the OTU in which the LO-ODUs are multiplexed while being nested on the two stages; however, possible embodiments are not limited to the example with two stages. For instance, the present disclosure is applicable to an OTU in which ODUs are multiplexed while being nested on three or more stages.

The MSI processing unit 50 is described above in such a manner that the converting unit 52 is realized with the hardware processing; however, the converting unit 52 may be realized with software processing.

The ADM 5A in the exemplary embodiments described above is configured to multiplex the HO-ODUs that store therein the LO-ODUs, so as to be nested on the multiple stages. It is, however, possible to change the combination patterns of the ODUs, as necessary.

When duplication has been detected between mutually-different LO-ODUs, the ADM 5A is configured so as to change the MSI value in which the change has been detected from among the duplicate MSI values, to the unused MSI value. However, it is also acceptable to change the MSI value in which no change has been detected.

When TS 3 is unused among TSs 1 to 4 corresponding to mutually the same LO-ODU as illustrated in FIG. 13, the ADM 5A is described above as being configured to change the MSI value "0x0A" of TSs 1, 2, and 4 to the unused MSI value "0x07". However, it is also acceptable to configure the ADM 5A to maintain the MSI value of TSs 1, 2, and 4.

Further, when TS 5 needs to be added to TSs 1 to 4 corresponding to mutually the same LO-ODU as illustrated in FIG. 14, the ADM 5A is described as being configured to change the MSI value "0x0A" of TSs 1 to 4 and the MSI value of TS 5 to the unused MSI value "0x07". However, it is also acceptable to configure the ADM 5A to maintain the MSI value of TSs 1 to 4 and to change the MSI value of TS 5 to the MSI value of TSs 1 to 4.

It is not necessary to physically configure the constituent elements of the functional units illustrated in the drawings as indicated in the drawings. In other words, the specific modes of distribution and integration of the functional units are not limited to the ones illustrated in the drawings. It is acceptable to functionally or physically distribute or integrate all or a part of the functional units in any arbitrary units, depending on various loads and the status of use.

Further, all or an arbitrary part of the various types of processing functions performed by the apparatuses may be realized by a Central Processing Unit (CPU) (or a microcomputer such as a Micro Processing Unit (MPU) or a Micro Controller Unit (MCU)). Further, needless to say, it is acceptable to arrange all or an arbitrary part of the various types of processing functions to be realized with the use of a computer program that is analyzed and executed by a CPU (or a microcomputer such as an MPU or an MCU) or with the use of hardware using wired logic.

According to at least one aspect of the exemplary embodiments, it is possible to keep the circuit scale small and to reduce the electric power consumption.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transfer apparatus comprising:
a network interface configured to receive a highest Optical channel Data Unit (ODU) storing therein at least a High Order (HO)-ODU that stores therein a plurality of Low Order (LO)-ODUs; and
a processor, wherein the processor executes a process comprising:
first extracting, from the highest ODU, first identification information including first identifier values that identify respectively LO-ODUs for the HO-ODU;
converting the first identifier values into second identifier values of second identification information, the second identifier values identifying respectively LO-ODUs for the highest ODU; and
second extracting respectively LO-ODUs from the highest ODU, based on the second identifier values.

2. The transfer apparatus according to claim 1, wherein the processor executes the process further comprising:
first judging whether a change is detected in either a configuration of the LO-ODUs for the highest ODU or the second identification information;
changing, in a case that the change is detected in either the configuration of the LO-ODUs for the highest ODU or the second identification information, either a second identifier value of the second identification information corresponding to the LO-ODU in which the change is detected or a second identifier value of the second identification information in which the change is detected, to an unused second identifier value which is usable in the second identification information.

3. The transfer apparatus according to claim 2, wherein the processor executes the process further comprising:
second judging, in the case that the change is detected in either the configuration of the LO-ODUs for the highest ODU or the second identification information, whether duplication of the second identifier values is detected between mutually-different LO-ODUs, from among the second identifier values that identify respectively LO-ODUs for the highest ODU, wherein the changing includes, in a case that the duplication of the second identifier values is detected, changing the duplicated second identifier value to the unused second identifier value.

4. The transfer apparatus according to claim 3, wherein the changing includes, in the case that the duplication of the second identifier values is detected, changing, from among duplicated second identifier values, either the second identifier value of the second identification information corresponding to the LO-ODU in which the change is detected by the first judging or the second identifier value of the second identification information in which the change is detected by the first judging to the unused second identifier value.

5. The transfer apparatus according to claim 2, wherein the converting includes converting first Multiplex Structure Identifier (MSI) values serving as the first identifier values, into second MSI values serving as the second identifier values, and
the changing includes, in the case that a change is detected in either the configuration of the LO-ODUs for the highest ODU or the second MSI values, changing respectively one or more second MSI values LO-ODU in which the change is detected, to an unused second MSI value which is usable in the second MSI values.

6. A transfer apparatus comprising:
a network interface configured to receive a highest Optical channel Data Unit (ODU) storing therein at least a High Order (HO)-ODU that stores therein a plurality of Low Order (LO)-ODUs; and
a processor, wherein the processor executes a process comprising:
first extracting, from the highest ODU, identification information including identifier values that identify respectively LO-ODUs for the HO-ODU;
judging whether a change is detected in either a configuration of the LO-ODUs for the highest ODU or the identification information;
changing, in a case that the change is detected in either the configuration of the LO-ODUs for the highest ODU or the identification information, either an identifier value of the identification information corresponding to the LO-ODU in which the change is detected or an identifier value of the identification information in which the change is detected, to an unused identifier value which is usable in the identification information; and
second extracting the LO-ODUs from the highest ODU, based on the changed identification information.

7. A transfer method implemented by a transfer apparatus, the transfer method comprising:
receiving, by a network interface of the transfer apparatus, a highest Optical channel Data Unit (ODU) storing therein at least a High Order (HO)-ODU that stores therein a plurality of LO-ODUs;
first extracting, from the highest ODU, first identification information including first identifier values that identify respectively LO-ODUs for the HO-ODU, by a processor of the transfer apparatus;
converting, by the processor, the first identifier values into second identifier values of second identification information, the second identifier values identifying respectively LO-ODUs for the highest ODU; and
second extracting, by the processor, respectively the LO-ODUs from the highest ODU, based on the second identifier values.

* * * * *